United States Patent
Osterstock

(10) Patent No.: US 6,609,308 B2
(45) Date of Patent: Aug. 26, 2003

(54) DRILLED SILICON NITRIDE BALL

(75) Inventor: Mark Osterstock, Mission Viejo, CA (US)

(73) Assignee: Q-Mark Manufacturing, Inc., Mission Vieyo, CA (US)

(*) Notice: Subject to any disclaimer, the term of this patent is extended or adjusted under 35 U.S.C. 154(b) by 0 days.

(21) Appl. No.: 10/058,714

(22) Filed: Apr. 22, 2002

(65) Prior Publication Data
US 2003/0084584 A1 May 8, 2003

Related U.S. Application Data

(60) Provisional application No. 60/339,767, filed on Nov. 2, 2001.

(51) Int. Cl.[7] .................................................. G01B 5/00
(52) U.S. Cl. ........................................................ 33/559
(58) Field of Search .......................... 33/503, 559, 560, 33/561

(56) References Cited

U.S. PATENT DOCUMENTS

| | | | | |
|---|---|---|---|---|
| 4,621,436 A | * | 11/1986 | Kurimoto | 33/561 |
| 5,018,278 A | * | 5/1991 | Aehnelt et al. | 33/559 |
| 5,083,884 A | * | 1/1992 | Miller et al. | 403/404 |
| 5,131,166 A | * | 7/1992 | Weber | 33/558 |
| 5,208,993 A | | 5/1993 | Harding | 33/559 |
| 5,321,895 A | * | 6/1994 | Dubois-Dunilac et al. | 33/559 |
| 5,345,690 A | * | 9/1994 | McMurtry et al. | 33/561 |
| 5,394,757 A | * | 3/1995 | Workman et al. | 33/559 |
| 6,370,788 B1 | * | 4/2002 | Hellier et al. | 33/559 |
| 6,415,676 B1 | * | 7/2002 | Takagi et al. | 74/424.88 |
| 6,459,281 B1 | * | 10/2002 | Carli | 33/561 |

* cited by examiner

Primary Examiner—G. Bradley Bennett
(74) Attorney, Agent, or Firm—Rutan & Tucker LLP; Robert D. Fish

(57) ABSTRACT

The present invention provides an improved probe tip (ball) made of silicon nitride that has a drilled cavity sized and dimensioned to receive a probe stem.

11 Claims, 1 Drawing Sheet

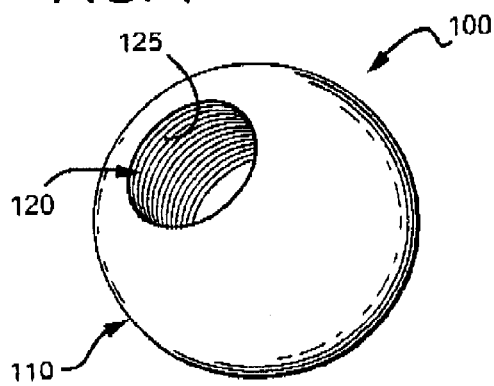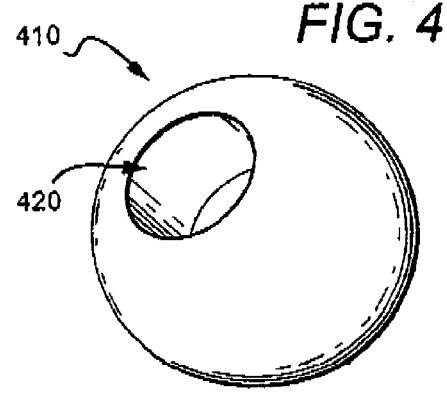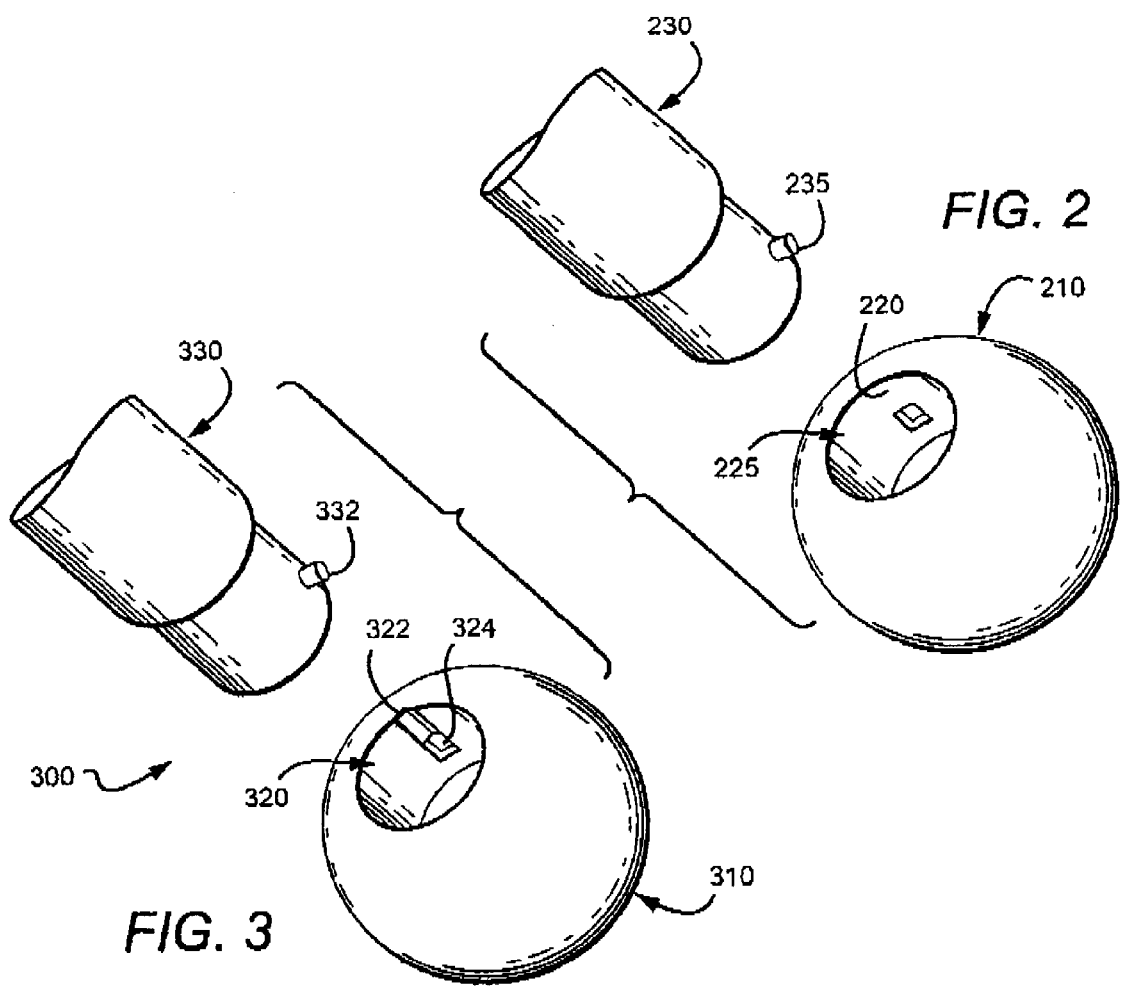

DRILLED SILICON NITRIDE BALL

This application claims the benefit of U.S. provisional application No. 60/339767 filed on Nov. 02, 2001 incorporated herein by reference in its entirety.

FIELD OF THE INVENTION

The field of the invention is coordinate measuring styli.

BACKGROUND OF THE INVENTION

A coordinate measuring machine (CMM) (e.g. a Zeiss Prismo VAST) is generally used for precise measurement of the shape and size of parts. Traditional CMMs operate by recording information about points along the surface of the part being measured. The information may be used by a computer to create an graphical representation of the part.

A significant trend with respect to CMMs is a process of measurement known as scanning in which a probe tip (ball) is in constant contact with the part being measured. Probe tips are preferably spherical in shape to maintain a constant distance to the center of the sphere regardless of the probe or work-piece (part) orientation. Eventually friction between the work-piece and the probe tip causes flat spots to form on the probe tip. This happens especially quickly during repetitive measuring tasks of hard materials such as diamond form tooling. The flat spots negatively impact the accuracy of the measurement and therefore necessitate that the probe tip be replaced.

U.S. Pat. No. 5,208,993 to Harding (May 1993) addresses at least some of the problems related to contact between the probe tip and the part being measured. Harding teaches a probe having a biasing mechanism that includes a spring. Because the biasing mechanism allows some degree of play, there may be relatively less wear of the probe tip. However, problems related to wear of the probe tip persisted even after employment of a biasing mechanism.

In addition to problems resulting from friction, there are problems related to the affixation of the probe tip to the probe stem. Affixing probe tips by adhesive has proven to be problematic, because the shape and composition of the probe tips make adhesion generally unreliable. Moreover, vibration and friction from the scanning process often cause such probe tips to separate from the probe stem. To counter this problem, a probe tip may be drilled and securely fastened to the probe stem using the cavity created by drilling. Known drilled tips used for scanning are often made of ruby or sapphire, but those balls are particularly prone to wear related problems and to picking up particulate matter during scanning.

There is a need for improved probe tips that have a relatively low coefficient of friction and are receptive to secure attachment to a probe stem.

SUMMARY OF THE INVENTION

The present invention provides a probe tip (ball) made of silicon nitride that has a drilled cavity sized and dimensioned to receive a probe stem.

A ball constructed out of $Si_3N_4$ would likely be less susceptible to formation of flat spots, less susceptible to accumulation of particles, and have a lower coefficient of friction. Such balls tend to produce a more accurate measurement for a longer period of time because of the reduced wear and the reduced susceptibility to accumulation. Additionally, a silicon nitride ball would likely last up to five times longer than a ruby ball, and be less likely to damage the scanned surface. Up to now, the possibility of using $Si_3N_4$ has been discounted, at least partially because it was not recognized that a ball made of $Si_3N_4$ could be securely attached to a probe stem for use in scanning applications. Such lack of recognition may have resulted from a perceived inability to effectively drill a silicon nitride ball.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a perspective view of a drilled silicon nitride ball having a threaded receiving area.

FIG. 2 is a perspective view of a drilled silicon nitride ball having a notched receiving area to receive a probe stem.

FIG. 3 is a perspective view of a stylus including a drilled silicon nitride ball.

FIG. 4 is a perspective view of a drilled silicon nitride ball having a smooth receiving area.

DETAILED DESCRIPTION

Referring first to FIG. 1, an improved probe tip 100 comprises a silicon nitride ball 110 and a drilled cavity 120.

A silicon nitride ball 110 is made substantially of $Si_3N_4$. A preferred silicon nitride ball 110 is highly polished so as to minimize friction during scanning although less polished surfaces, and even non-polished surfaces are still contemplated. Silicon Nitride typically has a hardness value of 1580 $Kg/mm^2$.

A preferred silicon nitride ball 110 is 1 mm in diameter. A more preferable ball 110 is 3 mm in diameter, and an even more preferable ball is 5 mm in diameter. Of course, reasonable variants of those sizes are contemplated.

With respect to the drilled cavity 120, it is generally contemplated that a silicon nitride ball 110 be drilled mechanically. To mechanically drill a highly polished sphere of silicon nitride with the necessary precision requires that a flat spot be abraded on the sphere surface. Silicon nitride balls have a relatively high resistance to abrasion. Therefore it is more difficult to create the flat spot needed to start the precision drilling process. Tool wear and breakage is significant, and the yield of satisfactory finished silicon nitride balls is much lower than those made from ruby or sapphire.

A drilled cavity 120 as defined herein is an impression or hole that is created by a mechanical method of drilling. A preferred drilled cavity 120 has a diameter between 0.3 mm and 5.0 mm, and a depth of between 0.4 mm and 6.5 mm. The cavity is sized and dimensioned to receive a probe stem, and as such the size and shape of the cavity will generally approximate the size and shape of a portion of the probe stem. This approximation, however, is not a requirement of the subject matter since all that is required is that the cavity be sized and dimensioned so as to sufficiently secure the ball for a scanning application. It may be advantageous to have larger diameter probe stems, and hence larger diameter cavities, for larger diameter balls 110. For example, it is contemplated that a silicon nitride ball with a 1 mm diameter may have a 0.4 mm diameter cavity 120; a 5 mm ball 110 may have a 2.0 mm diameter cavity; and so on.

In a preferred class of embodiments, a drilled cavity 120 will have a threaded receiving area 125 in order to sufficiently secure a ball 110. Sufficient security is defined herein to mean that a ball 110 will not separate from a probe stem while being used in a scanning application. Other suitable receiving areas may have some different or additional means for sufficiently securing the ball to the probe stem. For example, the receiving area may be notched to receive a pin from the probe stem.

In FIG. 2, a drilled silicon nitride ball 210 has a notched receiving area 225 to receive a probe stem 230.

A receiving area 225 generally comprises the interior walls of the drilled cavity 220. A notch may be formed into at least one of the walls in order to securely couple the ball 210 to the probe stem 230. The portion of the probe stem that extends into the drilled cavity 220 may have a pin 235.

As the probe stem 230 is inserted into the drilled cavity 220, the pin 235 will likely be deposed within the arm until the notch is reached, at which time the pin will extend into the notch to secure the attachment. Removal of the ball 210 may be accomplished by revolving the probe stem to depress the pin 235 back into the probe stem 230 (i.e. a spring loaded pin). Other known types of attachment may be utilized including permanent and removable attachments.

In another aspect, a coupler (not shown) may be employed to couple the ball to the probe stem. It is contemplated that the coupler may be permanently affixed to the receiving area 225 on one end, and removably coupled to the probe stem on the opposing end. As such, the ball-coupler assembly may be disposable. Permanent affixation may be accomplished by using a strong adhesive including wet adhesives, contact adhesives, and reaction adhesives.

In FIG. 3, a silicon nitride stylus 300 generally comprises a drilled silicon nitride ball 310, a notched and slotted receiving area 320, and a probe stem 330.

A notched and slotted receiving area 320 has a "V" shaped slot 322 that traverses the receiving area from the face of the ball 310 to the notch 324. The slot 322 may be regularly or irregularly shaped, and have a variety of sizes and dimensions. The size, dimension, and shape of the slot, however, should not be construed as limitations herein, except to the extent that it can accommodate a probe stem 330.

A notch 324 may also vary in size, shape, and dimensions, however, it should be sized and dimensioned such that when the probe stem 330 is coupled to the ball 310, the connection is relatively secure—that is, the probe stem will not separate from the ball 310 during a scanning application. A preferred notch 324 receives a pin 332 from the probe stem 330.

A probe stem 330 is generally an elongated member that is coupled on one end to the ball 310 and on the other end to a CMM. A preferred probe stem 330 is cylindrical in shape, comprised of carbide, and is approximately 50 mm long with a 3 mm diameter. Some classes of embodiments may utilize other materials, dimensions, sizes, and shapes. Among the contemplated materials that may comprise a probe stem 330 are ceramic, carbon fiber, and steel. The probe stem 330, depicted herein, has a pin 332 that is sized and dimensioned to fit the slot 322 and notch 324, and thus accommodates a probe stem 330. A preferred probe stem 330 may be threaded on one or both of the opposing ends to facilitate coupling to a ball 310 and a CMM or some other device.

In FIG. 4, a preferred embodiment of a drilled silicon nitride ball 410 is depicted. The ball 410 has a cylindrical receiving area 420 that is substantially smooth (i.e. no threads, grooves, slots, notches, and so on) and therefore readily susceptible to bonding to a probe stem (not shown).

Specific embodiments and applications of a drilled silicon nitride ball have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An improved probe tip comprising:

a silicon nitride ball having a drilled cavity sized and dimensioned to receive a probe stem.

2. The probe tip of claim 1, wherein the silicon nitride ball comprises a diameter of less than 10 mm.

3. The probe tip of claim 1, wherein a diameter of the drilled cavity comprises at least 0.3 mm.

4. The probe tip of claim 1, wherein the drilled cavity comprises a threaded receiving area.

5. The probe tip of claim 1, wherein the drilled cavity comprises a notched receiving area.

6. The probe tip of claim 5, wherein the probe stem comprises a spring loaded pin.

7. The probe tip of claim 1, further comprising the probe stem.

8. The probe tip of claim 7, wherein the drilled cavity comprises a substantially smooth receiving area and the probe stem is fixedly coupled to the smooth receiving area.

9. A coordinate measuring machine comprising the probe tip of claim 1.

10. A method of producing a probe tip comprising the steps of:

providing a silicon nitride ball;

abrading the silicon nitride ball to create an abrasion mark; and drilling a cavity into the silicon nitride ball using the abrasion mark.

11. The method of claim 10, further comprising:

threading an area within within the cavity; and coupling a probe stem to the silicon nitride ball by using the threaded area.

\* \* \* \* \*